Sept. 25, 1956     E. M. ASBURY     2,763,925
HEDGE TRIMMER
Filed July 10, 1953     2 Sheets-Sheet 1
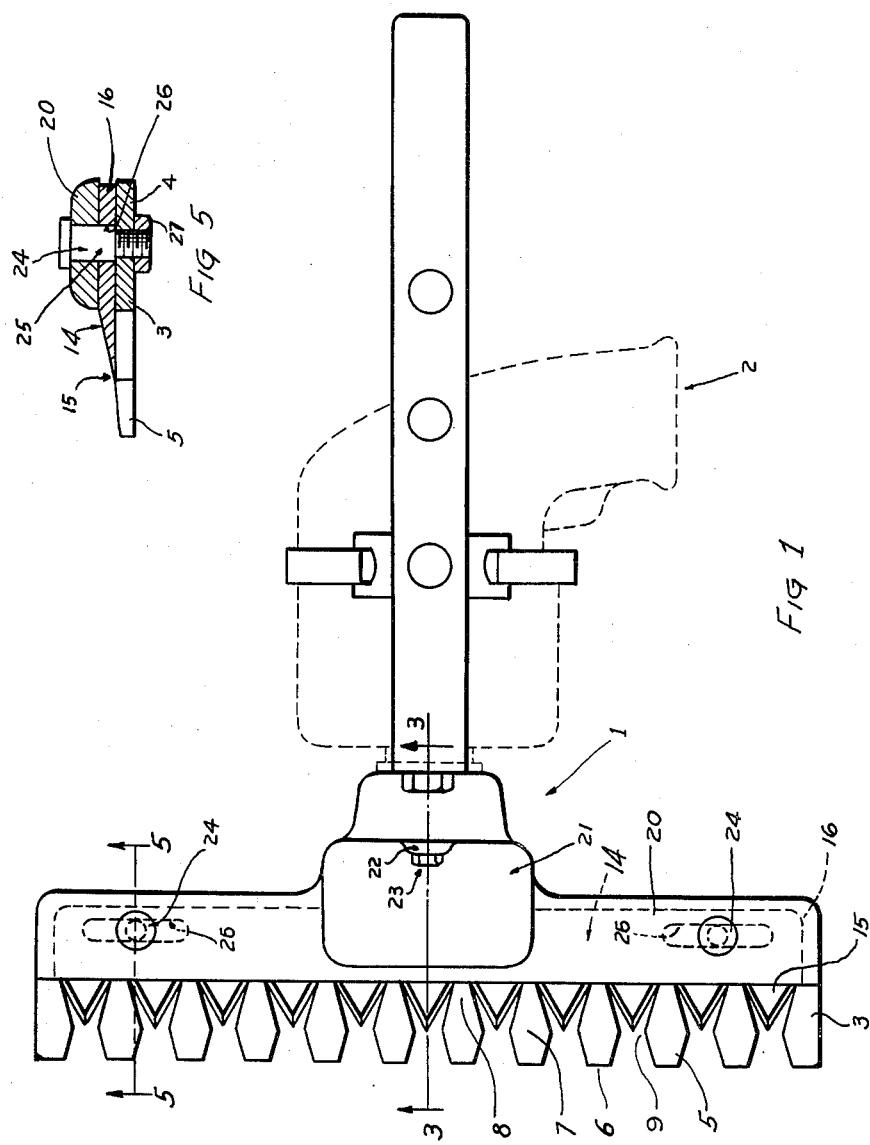

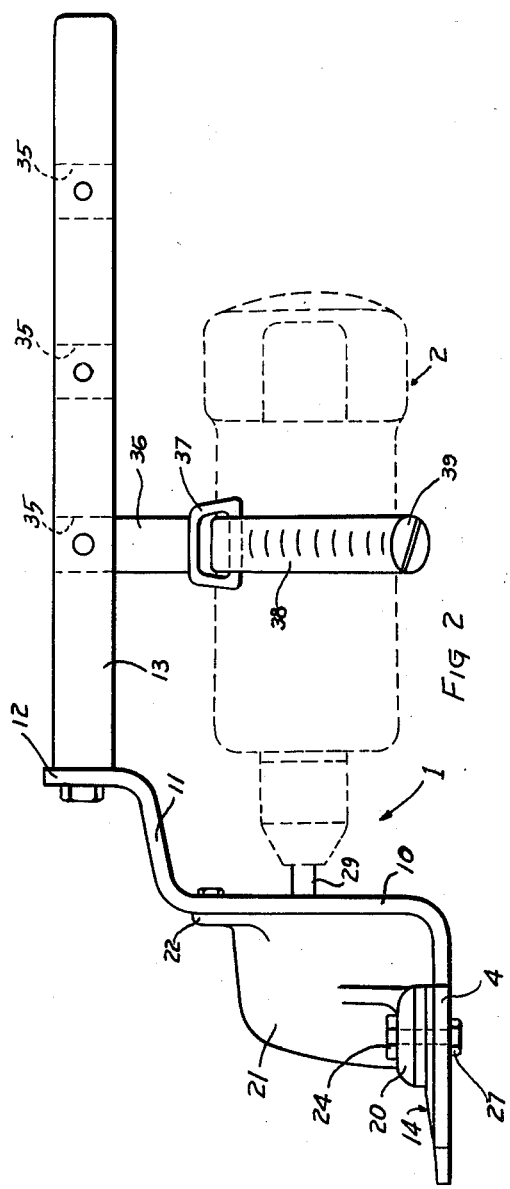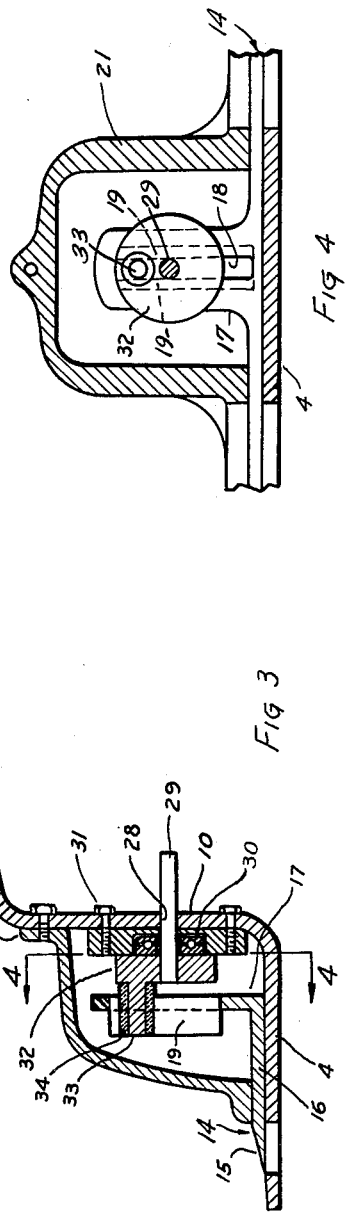

United States Patent Office 2,763,925
Patented Sept. 25, 1956

2,763,925

HEDGE TRIMMER

Edward M. Asbury, Penn Township, Allegheny County, Pa.

Application July 10, 1953, Serial No. 367,268

3 Claims. (Cl. 30—220)

This invention relates to new and useful improvements in portable tools and more particularly to a portable electric powered hedge trimmer.

While there are numerous electric powered portable hedge trimmers available on the market, there has been a demand for a satisfactory hedge trimmer attachment which can be powered by a portable electric drill. Many attempts have been made to provide a portable hedge trimmer attachment and have not been entirely satisfactory. One such atempt is illustrated by Patent 2,607,113 issued to John L. James and assigned to me. The attachment illustrated in the James patent was very satisfactory at first but in use was found to have certain weaknesses. This invention therefore, is an improvement of the hedge trimmer attachment shown in the James patent.

One of the objects of this invention, therefore, is to provide a hedge trimmer attachment which is readily operated by a portable electric drill.

Another object is to provide an improved hedge trimmer attachment for portable electric drills having an improved mechanism for supporting the drill regardless of its make or style.

A further object is to provide an improved hedge trimmer attachment having cutting bars shaped for more efficient and safe operation.

A still further object is to provide a hedge trimmer attachment having a more efficient and longer wearing mechanism for converting the rotary motion of a portable electric drill to the reciprocating motion required for operating a cutting bar.

Another object is to provide a hedge trimmer attachment which is more simply and inexpensively manufactured and assembled and is easier to operate.

Other objects will become apparent from time to time throughout the specification and claims as hereinafter related.

This invention comprises the new and improved construction and combination of parts and their operating relation to each other which will be described more fully hereinafter and the novelty of which will be particularly pointed out and distinctly claimed.

In the accompanying drawings, to be taken as a part of this specification, there is clearly and fully illustrated a preferred embodiment of this invention in which drawings:

Figure 1 is a top plan view of this hedge trimmer attachment with the outline of an electric drill shown in dotted lines, Figure 2 is a side elevation of the trimmer attachment shown in Figure 1, Figure 3 is a detail sectional view of the cutting bar and operation mechanism, taken on the line 3—3 of Figure 1, Figure 4 is a detail sectional view taken on the line 4—4 of Figure 3 and showing part of the mechanism for reciprocating the movable cutting bar, and Figure 5 is a detail sectional view taken on the line 5—5 of Figure 1 showing the guide pins for the movable cutting bar.

Referring to the drawings by numerals of reference there is shown a hedge trimmer attachment, generally designated 1, which supports a portable electric drill 2 shown in dotted lines. The trimmer 1 has a lower flat stationary cutting bar 3 formed of a heavy gage sheet metal. The cutting bar 3 has a rear flat supporting portion 4 and a notched forward portion providing a plurality of cutting teeth 5. The cutting teeth 5 have blunt ends 6 and taper to a wide middle portion 7 and back to a narrow base portion 8 thus giving each of the teeth the shape of a truncated rhombus. This tapered construction of the teeth 5 provides a relatively narrow clearance 9 between the teeth which will prevent a person of average size from inserting his fingers between the teeth inadvertently and thus protects the user against the hazard of cutting himself. The cutting bar 3 has an upturned supporting portion 10 extending upward from the rear edge portion of the supporting portion 4. The supporting portion 10 has an out-turned spacer portion 11 and an upturned supporting ear 12 for supporting a handle bar or rod 13.

A reciprocally movable cutting bar 14 is carried on the stationary cutting bar 3 and is arranged for reciprocating sliding movement thereon. The movable cutting bar 14 has a plurality of V-shaped cutting teeth 15, which are sharpened along both edges, and a rear supporting portion 16. The movable cutting bar 14 is positioned with the rear portion 16 supported for sliding movement on the supporting portion 4 of the stationary cutting bar 3. In this position the V-shaped movable cutting bar teeth 15 extend just to the widest middle portion of the stationary teeth 5. The V-shaped cutting teeth 15 are one less in number than the stationary teeth. The movable cutting bar 14 has an upstanding guide member or cam follower member 17 extending upward from the rear portion 16 thereof, which may be a separate member welded thereto or may be of the same sheet metal which forms the cutting bar. The guide member or cam follower member 17 has a vertical slot 18 cut therein with sheet metal on each side of the slot turned back to provide a pair of guide flanges 19 for the slot.

There is provided a cover plate or guard member 20 which overlies both the movable and stationary cutting bars and which has a hollow housing 21 formed integrally therewith. The guard member 20 and cover plate 21 are preferably made as a one piece casting. The housing 21 has an apertured ear portion 22 which is connected by a bolt or screw 23 to the upstanding portion 10 of the stationary cutting bar 3. The guard member 20 has a pair of bolts 24 at each end fastening it to the stationary cutting bar 3, as shown in Fig. 5. The bolts 24 have an enlarged hardened portion 25 which extends through guide slot 26 in the movable cutting bar 3 for guiding the reciprocal movement thereof. The bolts 24 extend through aligned apertures in the guard member 20 and the stationary cutting place 3 and are secured in place by nuts 27.

The upstanding portion 10 of the stationary cutting bar 3 forms the rear wall which closes the hollow housing 21 and has an aperture 28 through which extends a rotary shaft 29. The shaft 29 extends through a ball bearing support 30 which is secured to the wall portion 10 by a plurality of bolts or screws or the like 31. The shaft 29 carries a cam disc 32 on its end for rotation therewith. The cam disc 32 has a crank arm 33 and rotary bearing 34 which extends into the slot 18 with the bearing 34 engaging the inturned flanges 19. The cam disc 32 is operable upon rotation to reciprocate the movable cutting bar 14 by the co-action of the crank arm bearing 34 and the bearing flanges 19 of the slot 18.

The supporting rod 13 is provided with three threaded apertures 35 which are operable to receive a supporting post member 36. The supporting post 36 carries on its lower end a bracket member 37 supporting a metal strap 38. The bracket member 37 is of sufficient width to provide a supporting surface for the portable electric drill 2. The metal strap 38 is provided with a suitable clamping member such as a screw clamp 39 for clamping the drill tightly in position. When a drill is used which has an unusually long body the supporting post 36 can be moved to one of the other apertures 35 to provide a support farther out from the end of the shaft 29.

*Operation*

In operation this trimmer attachment functions generally as follows: A portable electric drill 2 is positioned with its chuck tightened on the shaft 29 and the body of the drill supported on the bracket 37 by the strap 38. If the shape of the drill requires it, the post 36 is threadedly adjustable to place the chuck in a centered relation with the shaft 29. When the motor of the drill is energized, the shaft 29 is rotated thus rotating the cam disc 32 and moving the bearing 34 in the slot 18 to cause the movable cutting bar 14 to reciprocate. The bolts 24 provide a guide for the bar 14 and have the shoulder adjacent their threaded ends of a length such that the guard member 20 is held in properly spaced relation to the stationary cutting bar. The bearing and shaft and crank construction which is used in this attachment provides a more rigid mechanism for transmission of power to the movable cutting blade which is less likely to get out of adjustment. The closed housing construction which is used herein provides a construction which is readily disassembled but which is completely enclosed to prevent injury due to inadvertent tampering with the transmission.

Having thus described the invention, what is claimed and is desired to be secured by Letters Patent of the United States is:

1. A hedge trimmer for attachment to a portable electric drill, comprising a stationary cutting bar having a drill supporting mechanism secured thereto, said supporting mechanism including a supporting rod extending laterally to said cutting bar, a supporting post, bracket, and securing strap carried by said supporting rod; a movable cutting bar slidably guided on said stationary cutting bar, said movable cutting bar having a cam follower member with a flanged slot extending normal to the plane of said movable cutting bar, a disc member having a crank arm extending into said flanged slot and having a rotary shaft, a ball bearing supporting structure for said shaft supported on said stationary cutting bar, a rotary bearing on said crank arm engaging the flanges of said slot, said shaft being positioned to receive the chuck of a portable drill when placed in said drill supporting mechanism and rotatable to cause said movable cutting bar to reciprocate, and said supporting post being adjustable relative to said supporting rod to center the electric drill relative to said rotary shaft.

2. A hedge trimmer for attachment to a portable electric drill, comprising a stationary cutting bar having an upstanding sheet metal portion and a drill supporting rod secured at the upper end portion thereof, a movable cutting bar supported on said stationary cutting bar and having guide slots adjacent each end thereof, a pair of bolts extending through said slots and securing said cutting bars together for reciprocal sliding movement, said upstanding portion having an aperture therethrough, a ball bearing shaft supporting structure secured on said upstanding portion adjacent said aperture, a disc member having a crank arm with a rotary bearing thereon and a rotary shaft extending through said bearing shaft supporting structure and said aperture, a cam follower member formed integrally with said movable cutting bar, said cam follower having a slot extending normal to the plane of said cutting bars and having inturned metal portions forming flanged edges therefor, said crank arm extending into said slot with said rotary bearing engaging said flanged edges and operable to reciprocate said movable cutting bar upon rotation of said shaft, a supporting post, bracket, and securing strap carried by said supporting rod, and said supporting post being adjustable relative to said supporting rod to support and center a portable drill for operative engagement of its chuck with said rotary shaft.

3. A hedge trimmer for attachment to a portable electric drill, comprising a stationary cutting bar having a plurality of teeth and a rear supporting portion, said rear portion having an upturned wall portion and a supporting rod secured at the uppermost end portion thereof, a movable cutting bar having a plurality of teeth and a rear supporting portion overlying said first-named supporting portion and slidably secured thereon, an elongated guard plate and hollow housing member cast as a single member, said housing member being secured to said upturned wall portion with the guard plate portions thereof overlying said cutting bar rear portions, aligned apertures in said guard plate and stationary cutting bar adjacent each end thereof, said movable cutting bar having a slot at each end aligned with said apertures, a pair of bolts extending through said apertures and slots and having an enlarged hardened portion in said slots providing guides for reciprocal movement of said movable cutting bar and securing said guard member to said stationary cutting bar, said movable cutting bar having an upstanding cam follower member inside said housing member, said cam follower member having a slot formed therein normal to the plane of said cutting bars with metal on each side thereof to form side flanges for said slot, a disc member having a crank arm with a rotary cam thereon said rotary cam being positioned in said slot and engaging both of said side flanges, and said disc having a rotary shaft, said upturned wall portion having an aperture therethrough, a ball bearing shaft-supporting member supported on said upturned wall portion within said housing member and aligned with said last-named aperture, said shaft extending through and being supported in said shaft-supporting member and aperture and being operable upon rotation to move said rotary bearing in said guide member slot to reciprocate said movable cutting bar, a supporting post, bracket and securing strap carried by said supporting rod, and said supporting post and strap being adjustable relative to said rod to support centrally a portable drill for operative engagement of its chuck with said rotary shaft.

References Cited in the file of this patent

UNITED STATES PATENTS

| Number | Name | Date |
|---|---|---|
| 287,794 | Benson | Nov. 6, 1883 |
| 347,263 | Burgess | Aug. 10, 1886 |
| 1,269,880 | Trowbridge | June 18, 1918 |
| 1,838,690 | Lepiane et al. | Dec. 29, 1931 |
| 2,559,725 | Mansperger | July 10, 1951 |
| 2,607,113 | James | Aug. 19, 1952 |